United States Patent
Sturges et al.

(10) Patent No.: US 6,629,208 B2
(45) Date of Patent: *Sep. 30, 2003

(54) CACHE SYSTEM FOR CONCURRENT PROCESSES

(75) Inventors: Andrew Craig Sturges, Bath (GB); David May, Clifton (GB)

(73) Assignee: SGS-Thomson Microelectronics Limited, Almondsbury Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/924,289

(22) Filed: Aug. 8, 2001

(65) Prior Publication Data

US 2002/0002657 A1 Jan. 3, 2002

Related U.S. Application Data

(63) Continuation of application No. 09/014,194, filed on Jan. 27, 1998, now Pat. No. 6,295,580.

(30) Foreign Application Priority Data

Jan. 30, 1997 (GB) ............................................. 9701960
Dec. 1, 1997 (GB) ............................................. 9725437

(51) Int. Cl.⁷ ............................................. G06F 12/00
(52) U.S. Cl. ......................... 711/129; 711/153; 709/215
(58) Field of Search ............................. 711/129, 153, 711/168–173, 118; 709/213–215, 250; 345/539, 544, 557; 710/100

(56) References Cited

U.S. PATENT DOCUMENTS

| | | | |
|---|---|---|---|
| 4,654,782 A | | 3/1987 | Bannai et al. |
| 4,905,141 A | * | 2/1990 | Brenza .................... 711/129 |
| 5,487,162 A | | 1/1996 | Tanaka et al. |
| 5,537,635 A | * | 7/1996 | Douglas .................... 711/129 |
| 5,584,014 A | | 12/1996 | Nayfeh et al. |
| 5,588,138 A | * | 12/1996 | Bai et al. .................... 711/173 |
| 5,796,944 A | | 8/1998 | Hill et al. |
| 5,809,522 A | * | 9/1998 | Novak et al. ............... 711/118 |
| 5,875,464 A | | 2/1999 | Kirk |
| 6,038,647 A | * | 3/2000 | Shimizu .................... 711/168 |
| 6,295,580 B1 | * | 9/2001 | Sturges et al. ............. 711/129 |

FOREIGN PATENT DOCUMENTS

GB    2 311 880 A    10/1997

OTHER PUBLICATIONS

Standard Search Report performed by the European Patent Office, dated Oct. 16, 1997.

International Search Report from UK priority application No. 9701960.8, filed Jan. 30, 1997.

European Search Report for European application No. 98 30 0518, search completed May 8, 1998.

(List continued on next page.)

*Primary Examiner*—Donald Sparks
*Assistant Examiner*—Nasser G Moazzami
(74) *Attorney, Agent, or Firm*—Wolf, Greenfield & Sacks, P.C.; James N. Morris; Robert A. Skrivanek, Jr.

(57) ABSTRACT

A method of operating a cache memory is described in a system in which a processor is capable of executing a plurality of processes, each process including a sequence of instructions. In the method a cache memory is divided into cache partitions, each cache partition having a plurality of addressable storage locations for holding items in the cache memory. A partition indicator is allocated to each process identifying which, if any, of said cache partitions is to be used for holding items for use in the execution of that process. When the processor requests an item from main memory during execution of said current process and that item is not held in the cache memory, the item is fetched from main memory and loaded into one of the plurality of addressable storage locations in the identified cache partition.

10 Claims, 5 Drawing Sheets

OTHER PUBLICATIONS

Standard Search Report performed on Feb. 20, 1998 for RS 99958.

*Compiler Support for Software–Based Cache Partitioning*, Frank Mueller, ACM SigPlan Notices, vol. 30, No. 11, Nov. 1995, pp 125–133.

Dongwook, K et al., *A Partitioned On–chip Virtual Cache for Fast Processors*, May, 1997, 519–531, Journal of Systems Architecture, vol. 43, No. 8.

Kirk D.B., *Smart (Strategic Memory Allocation for Real–Time) Cache Design*, Dec. 5–7, 1989, IEEE pp 229–237.

Patent Abstracts of Japan, Japanese Publication No. 08235072A, publication date Sep. 13, 1996, Sun Microsystems Inc.

Patent Abstracts of Japan, Japanese Publication No. 04100158A, publication date Apr. 2, 1992, PFU Ltd.

Patent Abstracts of Japan, Japanese Publication No. 04049446A, publication date Feb. 18, 1992, NEC Corp.

* cited by examiner

CACHE SYSTEM FOR CONCURRENT PROCESSES

This application is a continuation of prior application Ser. No. 09/014,194, filed on Jan. 27, 1998, entitled A CACHE SYSTEM FOR CONCURRENT PROCESSES and now U.S. Pat. No. 6,295,580.

FIELD OF THE INVENTION

The present invention relates to a cache system for operating between a processor and a main memory of a computer, and is particularly concerned with a processor capable of executing a plurality of concurrent processes.

BACKGROUND TO THE INVENTION

As is well known in the art, cache memories are used in computer systems to decrease the access latency to certain data and code and to decrease the memory bandwidth used for that data and code. A cache memory can delay, aggregate and reorder memory accesses.

A cache memory operates between a processor and a main memory of a computer. Data and/or instructions which are required by the process running on the processor can be held in the cache while that process runs. An access to the cache is normally much quicker than an access to main memory. If the processor does not locate a required data item or instruction in the cache memory, it directly accesses main memory to retrieve it, and the requested data item or instruction is loaded into the cache. There are various known system for using and refilling cache memories.

In order to rely on a cache in a real time system, the behaviour of the cache needs to be predictable. That is, there needs to be a reasonable degree of certainty that particular data items or instructions which are expected to be found in the cache will in fact be found there. Most existing refill mechanisms will normally always attempt to place in the cache a requested data item or instruction. In order to do this, they must delete other data items or instructions from the cache. This can result in items being deleted which were expected to be there for later use. This is particularly the case for a multi-tasking processor, or for a processor which has to handle interrupt processes or other unpredictable processes.

It is an object of the present invention to provide a cache system which provides greater predictability of caching behaviour for a processor executing a plurality of concurrent processes.

In this context, concurrent processes are considered to be processes which are executed by a common processor, but not necessarily simultaneously. That is, a first process may start to run and may be interrupted for some reason. The processor will then start to execute a second process but is ready to interrupt that when the first process is ready to run again or in response to some other prompt. This is managed by a process handler. It is important that data and/or instructions associated with the first process are not evicted from the cache while the second process is running. Conversely, it is useful to allow the second process to have access to the cache while it is running. Consider for example the situation illustrated in FIG. 8 where two processes, process A and process B are running concurrently on one CPU. Process A is scheduled first and while it has the CPU it may completely fill the data cache with its own data, evicting any data which has been placed in the data cache for process B. When control then swaps to process B, it may then reverse the state of the data cache, throwing out all of the data of process A and bringing in its own. This ping-ponging of data of date cache state is common between concurrent processes and is often detrimental to performance.

SUMMARY OF THE INVENTION

According to one aspect of the present invention there is provided a method of operating a cache memory arranged between a processor and a main memory of a computer, the processor being capable of executing a plurality of processes wherein each process includes a sequence of instructions, the method comprising:

dividing the cache memory into cache partitions, each cache partition having a plurality of addressable storage locations for holding items in the cache memory;

allocating to each process a partition indicator identifying which, if any, of said cache partitions is to be used for holding items for use in the execution of that process; and when the processor requests an item from main memory during execution of said current process and that item is not held in the cache memory, fetching the item from main memory and loading it into one of the plurality of addressable storage locations in the identified cache partition.

By allocating a partition indicator to each process, processes running concurrently on the processor are prevented from evicting each others data and/or instructions from the cache memory. That is, the cache partition allocated for example to a first process running on the processor cannot be overwritten by a subsequent, second process. Instead, the second process will have its own cache partition allocated to it. It is of course preferable that the allocation of partition indicators to processes can be altered so that once the first process has completely finished, the cache partition which was allocated to it can then be allocated to another process.

Depending on the needs of the process, it is possible to allocate more than one cache partition to a process or to deny a process access to the cache at all.

In the described embodiment, the partition indicator for a current process which is being executed is held in a process status store which also holds status information about the process. This is referred to herein as the thread status word register. When a new process is to be executed by the processor, a new thread status word is loaded into the store with a new partition indicator allocated to that process.

The partition indicator can be included in a group identifier for the process, the group identifier identifying an address space for the process. In a virtual addressing system, the processor issues addresses comprising a virtual page number and a line-in page number and a translation look-aside buffer is provided for translating the virtual page number to a real page number for accessing the main memory. The translation look-aside buffer can thus also receive the group identifier and derive therefrom the partition indicator for the current process depending on the virtual address space which has been allocated to the process.

The line-in page number of the items addressed can be used to identify the address storage location within the cache partition into which the item is to be located. That is, each cache partition is direct-mapped. It will be apparent that it is not necessary to use all of the end bits of the item's address as the line-in page number, but merely a set of appropriate bits. These will normally be near the least significant end of the address.

Once or more cache partitions may be allocated to a process.

The system can include a cache access circuit which accesses items from the cache memory according to the address in main memory of said items and regardless of the cache partition in which the items is held in the cache memory. That is, the partition indicator is only used on refill and not on look-up. Thus, a cached item can be retrieved from its partition even if subsequent to its caching that partition is now allocated to a process associated with a different address space.

According to another aspect of the invention there is provided a computer system comprising:

- a processor for executing a plurality of processes wherein each process includes a sequence of instructions, the processor including a process status store which holds a partition indicator for a current process which is currently being executed;
- a main memory;
- a cache memory having a set of cache partitions, each cache partition comprising a plurality of addressable storage locations for holding items fetched from said main memory for use by the processor in execution of its processes; and
- a cache refill mechanism arranged to fetch an item from the main memory and to load said item into the cache memory at one of said addressable storage locations, wherein the cache refill mechanism selects said one of said addressable storage locations for loading said items in dependence on the partition indicator held in the process status store in association with the current process.

Each process can include one or more sequence of instructions held at addresses in the main memory within a common page number. Cache partitions can be allocated to processes by associating each cache partition with page numbers of a particular process in the main memory. This is described in our earlier GB Application No. 9701960.8.

As an alternative, a partition indicator can be held in the thread status word register and supplied directly to the cache refill mechanism.

The number of addressable storage locations in each cache partition can be alterable. Also, the association of cache partitions to page numbers can be alterable while a process using these page numbers is being run by the processor.

The following described embodiment illustrates a cache system which gives protection of the contents of the cache against unexpected eviction by reading from or writing to cache lines from other processes whose data are placed in other partitions. It also provides a system in which the contents of the cache may be predicted.

For a better understanding of the present invention and to show how the same may be carried into effect, reference will now be made by way of example to the accompanying drawings.

DESCRIPTION OF THE PREFERRED EMBODIMENT

Figure 1:
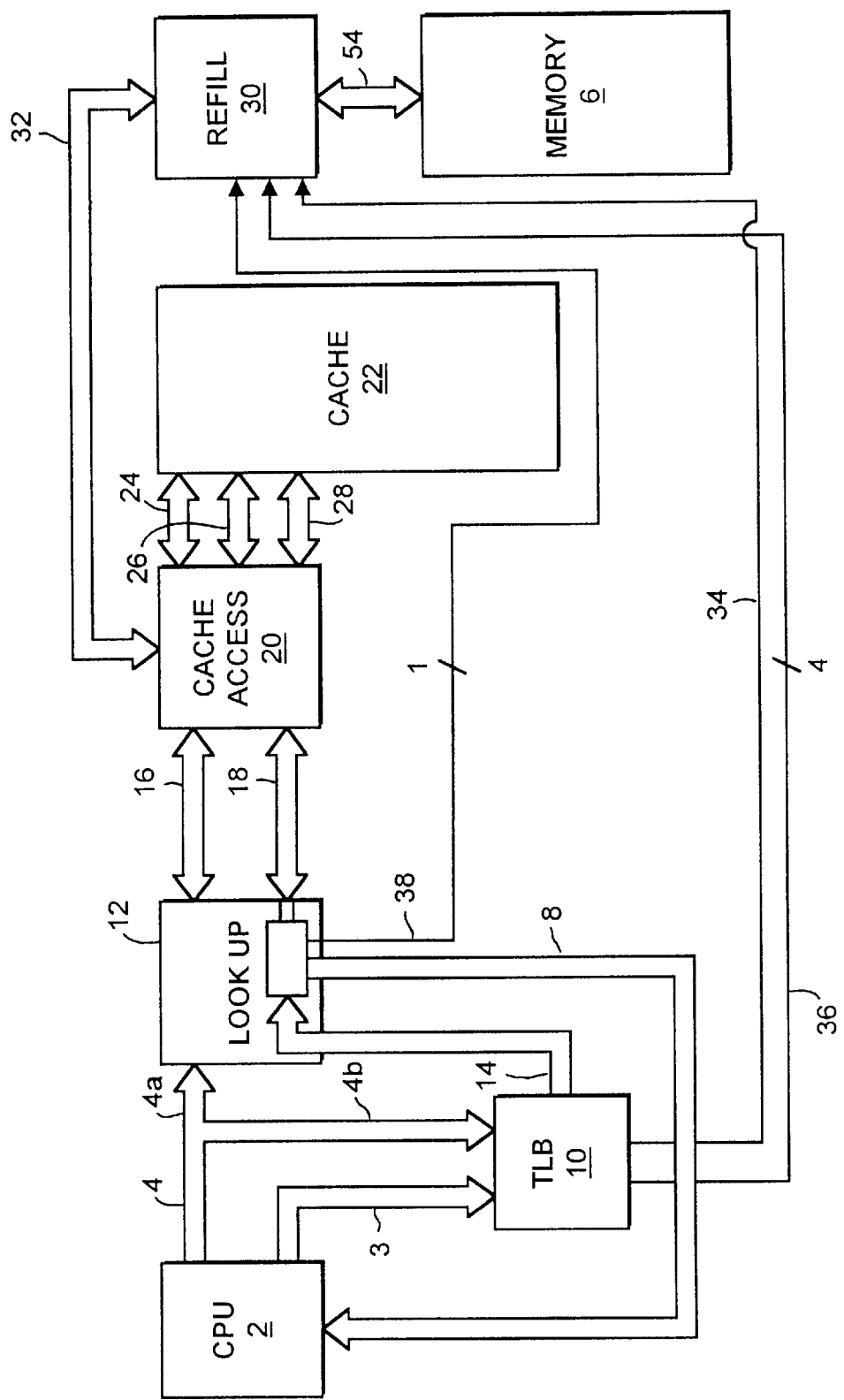
FIG. 1 is a block diagram of a computer incorporating a cache system.

FIG. 1 is a block diagram of a computer incorporating a cache system. The computer comprises a CPU 2 which is connected to an address bus 4 for accessing items from a main memory 6 and to a data bus 8 for returning items to the CPU 2. Although the data bus 8 is referred to herein as a data bus, it will be appreciated that this is for the return of items from the main memory 6, whether or not they constitute actual data or instructions for execution by the CPU. The system described herein is suitable for use on both instruction and data caches. As is know, there may be separate data and instruction caches, or the data and instruction cache may be combined. In the computer described herein, the addressing scheme is a so-called virtual addressing scheme. The address is split into a line in page address 4a and a virtual page address 4b. The virtual page address 4b is supplied to a translation look-aside buffer (TLB) 10. The line in page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to a cache memory 22 via an address bus 24, a data bus 26 and a control bus 28 which transfers replacement information for the cache memory 22. A refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line in page address of an item in the main memory 6. The refill engine 30 also receives a partition indicator from the translation look-aside buffer 10 on a four bit bus 36. The function of the partition indicator will be described hereinafter.

Finally, the refill engine 30 receives a miss signal on line 38 which is generated in the look-up circuit 12 in a manner which will be described more clearly hereinafter.

The cache memory 22 described herein is a direct mapped cache. That is, it has a plurality of addressable storage locations, each location constituting one row of the cache. Each row contains an item from main memory and the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001. Clearly, in the main memory, there would be many such addresses and thus potentially many data items to be held at that row in the cache memory. Of course, the cache memory can hold only one data item at that row at any one time.

Operation of the computer system illustrated in FIG. 1 will now be described but as though the partition indicator was not present. The CPU 2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line in page number 4a of the original address transmitted by the CPU 2. The line in page address is used by the cache access circuit 20 to address the cache memory 22. The line in page address includes a set of least significant bits (not necessarily including the end bits) of the main address in memory which are equivalent to the row address in the cache memory 22. The contents of the cache memory 22 at the row address identified by the line in page address, being a data item (or instruction) and the address in main memory of the data item (or instruction), are supplied to the look-up circuit 12. There, the real page number of the address which has been retrieved from the cache memory is compared with the real page number which has been supplied from the translation look-aside buffer 10. If these addresses match, the look-up circuit indicates a hit which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute. In a direct mapped cache memory as outlined above, it will be apparent that the data item and its address recalled from the main memory 6 will be loaded into the storage location from which the data item was originally accessed for checking. That is, it will be over-written into the only location which can accept it, having a row address matching the set of least significant bits in the line in page address in main memory. Of course, the page number of the data item originally stored in the cache memory and the data item which is now to be loaded into it are different. This "one to one mapping" limits the usefulness of the cache.

Figure 2:
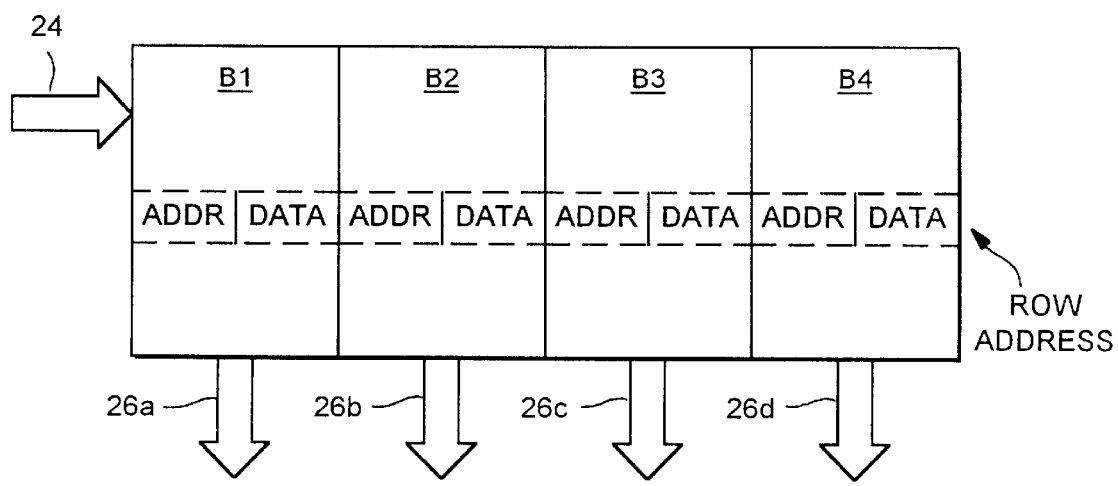
FIG. 2 is a sketch illustrating a four way set associative cache.

To provide a cache system with greater flexibility, an n-way set associative cache memory has been developed. An example of a 4-way set associative cache is illustrated in FIG. 2. The cache memory is divided into four banks B1,B2,B3,B4. The banks can be commonly addressed row-wise by a common row address, as illustrated schematically for one row in FIG. 2. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line in page address). Each time a row is addressed, four cache entries are output and the real page numbers of their addresses are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Nevertheless, the n-way set associative cache (where n is the number of banks and is equal to four in FIG. 2), while being an improvement on a single direct mapped system is still inflexible and, more importantly, does not allow the behaviour of the cache to be properly predictable.

The system described herein provides a cache partitioning mechanism which allows the optimisation of the computer's use of the cache memory by a more flexible cache refill system.

Figure 3:
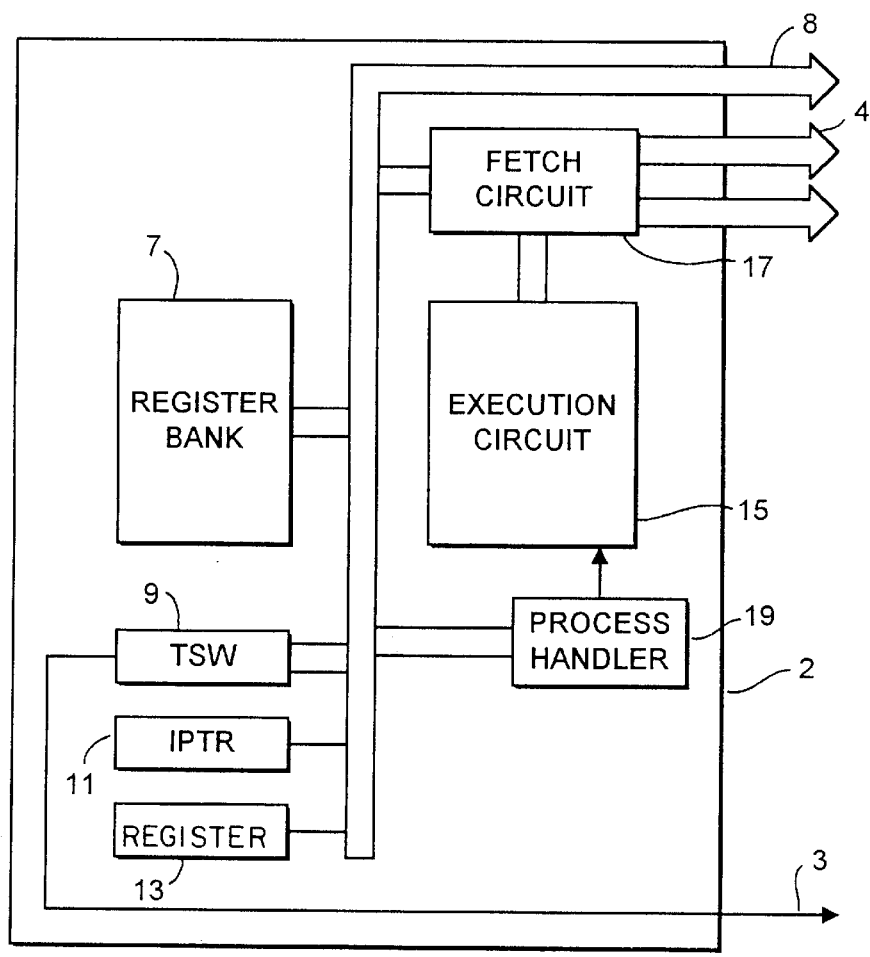
FIG. 3 is a block diagram of the CPU of FIG. 1.

FIG. 3 is a schematic block diagram of a CPU 2 using the computer of FIG. 1. The CPU 2 comprises an execution circuit 15 which is connected to a fetch circuit 17 which is responsible for addressing memory via the memory bus 4 and retrieving data an instructions via the data bus 8. A set of general purpose registers 7 is connected to the execution circuit 15 for holding data and instructions for use in executing a process. In addition, a set of special registers are provided, denoted by reference numerals 9, 11 and 13. There may be any number of special purpose registers and by way of example register 11 holds the instruction pointer which identifies the line of code which is currently being executed. In addition, special register 9 holds a thread status word which defines the status of a process being executed by the CPU 2. The execution circuit 15 is capable of executing one process or sequence of instructions at any one time. However, it is equally capable of interrupting that process and starting to execute another process before the first process has finished executing. There are many reasons why a process currently being executed by the execution circuit 15 may be interrupted. One is that a higher priority interrupt process is to be executed immediately. Another is that the process being executed is currently awaiting data with a long latency, so that it is more efficient for the execution circuit to commence executing a subsequent process while the first process is waiting for that data. When the data has been received, the first process can be rescheduled for execution. The execution of concurrent processes is known per se and is managed by a process handler 19.

Each process is executed under a so-called "thread" of control. A thread has the following state:
  an instruction pointer which indicates where in the process the thread has advanced to,
  a jump pointer which indicates where the process will branch to next,
  a set of general purpose registers 7 which contain immediately accessible values,
  the mapping of virtual addresses to physical addresses,
  the contents of memory accessible through the virtual addresses,
  control registers accessible by the thread, and
  optionally other values such as floating point rounding mode, whether the thread has kernel privileges etc.

Some of the above state is specified by a small set of values which is referred to herein as thread status word and which is held in the thread status word register 9. The thread status word specifically holds information about:
  whether the thread is in kernel mode or not,
  which virtual address space the thread can access,
  the floating point flags, trap enables and modes, debug information, and
trap optimisation information.

The format of the thread status word is defined in Table I.

TABLE I

| Name | Bits[a] | Size | Description |
|---|---|---|---|
| TSW.FPFLAG | 0–7 | 8 | Floating point exception flags. |
| TSW.FPTRAP | 8–15 | 8 | Floating point exception traps. |
| TSW.FPMODE | 16–19 | 4 | Floating point modes. |
|  | 20–31 |  | Reserved. |
| TSW.USER | 32 | 1 | Kernel mode (0)/user mode (1). |
| TSW.SINGLE | 33 | 1 | Single step mode. |
| TSW.TLB | 34 | 1 | First level TLB miss handler indicator. |
| TSW.WATCH | 35 | 1 | Watchpoints enabled. |
| TSW.ENABLE | 36 | 1 | Trap enable. |
|  | 37–47 | 11 | Reserved. |
| TSW.GROUP | 48–55 | 8 | Group number. |
|  | 56–63 |  | Reserved. |

As can be seen from Table I, the thread status word includes an 8 bit group number. This is used as described in the following to generate the partition indicator for allocating cache partitions.

In the translation look-aside buffer 10 in the system described herein, each TLB entry has associated with the virtual page number, a real page number and an information sequence. The information sequence contains various information about the address in memory in a manner which is known and which will not be described further herein. However, according to the presently described system the information sequence additionally contains a partition code which generates a partition indicator PI dependent on the group number and the virtual page number. This is illustrated diagrammatically in FIG. 4, where VP represents the virtual page number, RP represents the real page number, GN represents the group number and INFO represents the information sequence. In the described embodiment PI is four bits long.

Thus, bits 0 to 3 of the information sequence INFO constitute the partition indicator. The partition indicator gives information regarding the partition into which the data item may be placed when it is first loaded into the cache memory 22. For the cache structure illustrated in FIG. 2, each partition can constitute one bank of the cache. In the partition indicator, each bit refers to one of the banks. The value of 1 in bit j of the partition indicator means that the data may not be placed in partition j. The value of 0 in bit j means that the data may be placed in partition j. Data may be placed in more than one partition by having a 0 in more than one bit of the partition indicator. A partition indicator which is all zeros allows the data to be placed in any partition of the cache. A partition indicator which is all ones does not allow any data items to be loaded into the cache memory. This could be used for example for "freezing" the contents of the cache, for example for diagnostic purposes.

Figure 4:
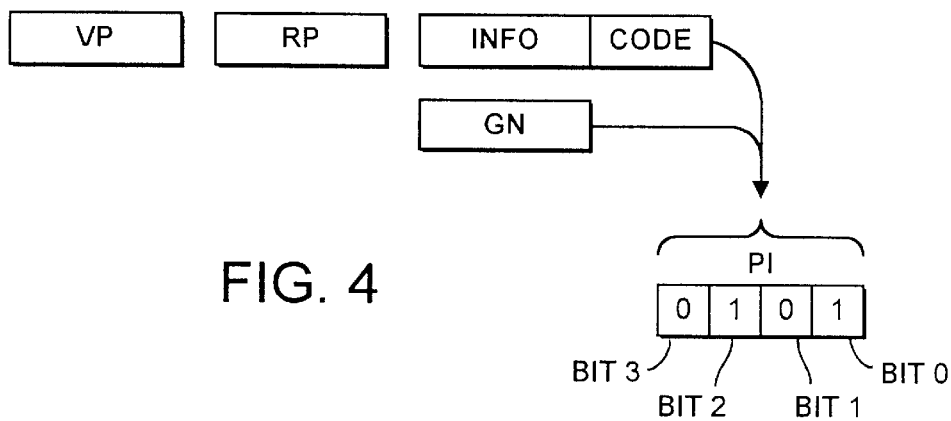
FIG. 4 is an example of an entry in a translation look-aside buffer.

In the example given in FIG. 4, the partition indicator indicates that replacement of data items may not use banks B1 or B3 but may use banks B2 or B4.

It is quite possible to allocate more than one bank to a process. In that case, if the line in page address has more bits than the row address for the cache, the partitions would behave as a k-way set associative cache, where k partitions are allocated to a page. Thus, in the described example the process of FIG. 4 can use banks B2 and B4. However, it may not use banks B1 and B3.

The partition information is not used on cache look-up, but only upon cache replacement or refill. Thus, the cache access can locate data items held anywhere in the cache memory, whereas a replacement will only replace data into the allowed partitions for that process.

Figure 5:
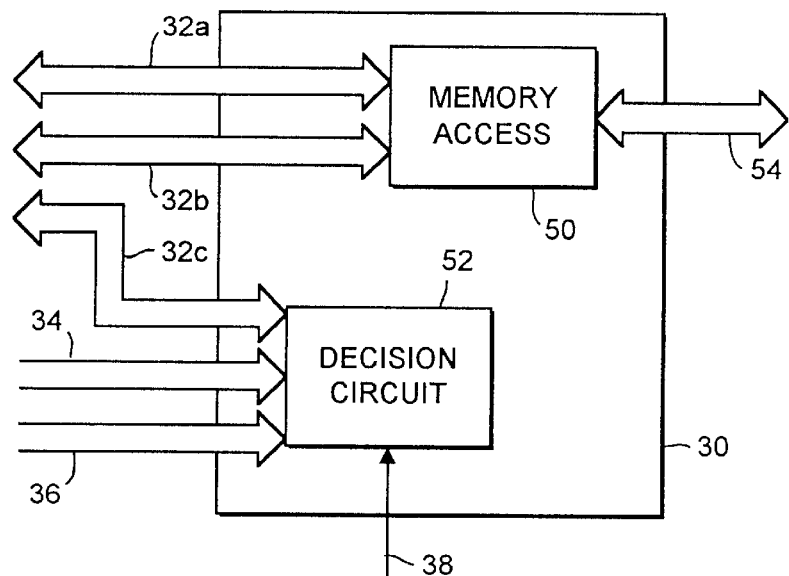
FIG. 5 is a block diagram of the refill engine.

FIG. 5 illustrates in more detail the content of the refill engine 30. The refill bus 32 is shown in FIG. 4 as three separate buses, a data bus 32a, an address bus 32b and a bus 32c carrying replacement information. The address and data buses 32b and 32a are supplied to a memory access circuit 50 which accesses the main memory via the memory bus 54. The replacement information is fed to a decision circuit 52 which also receives the real address 34, the partition indicator PI on bus 36 and the miss signal 38. The decision circuit 52 determines the proper partition of the cache into which data accessed from the main memory is to be located.

Figure 6:
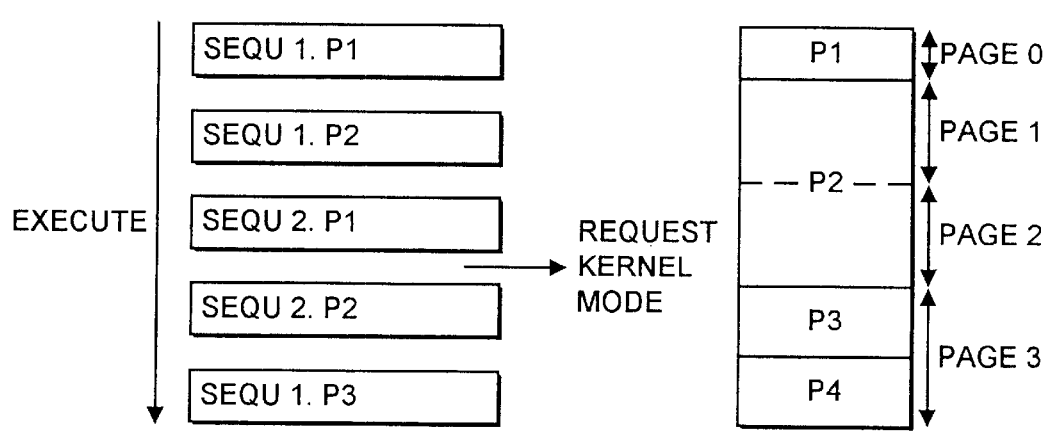
FIG. 6 is a diagram illustrating the operation of a multi-tasking processor.

The cache partitioning mechanism described herein is particularly useful for a multi-tasking CPU. A multi-tasking processor is capable of executing concurrent processes, that is running more than one process "simultaneously". In practice, the processor executes part of a process and, when that process is halted for some reason, perhaps in need of data or a stimulus to proceed, the processor immediately begins executing another process. Thus, the processor as always operating oven when individual processes may be held up waiting for data or another stimulus to proceed. FIG. 6 illustrates diagrammatically such a situation. On the left hand side of FIG. 6 is illustrated the sequence which a processor may undertake to run different processes P1, P2, P3, P4. On the right hand side of FIG. 6 is an illustration of where these processes may expect their data to be held in memory. Thus, the data for the process P1 are held on page 0. The data for process P2 are held on pages 1 and 2. Data for processes P3 and P4 share page 3. In the example, the processor executes a first sequence of process P1, a first sequence of process P2, a second sequence of process P1, a second sequence of process P2 and then a first sequence of process P3. When the second sequence of the process P1 has been executed, the process P1 has been fully run by the processor. It will readily be apparent that in a conventional cache system, once the processor has started executing the first sequence of the process P2, and is thus requesting accesses from page 1, the data items and instructions in these lines will replace in the cache the previously stored data items and instructions from page 0. However, these may soon again be required when the second sequence of the process P1 is executed.

Figure 7:
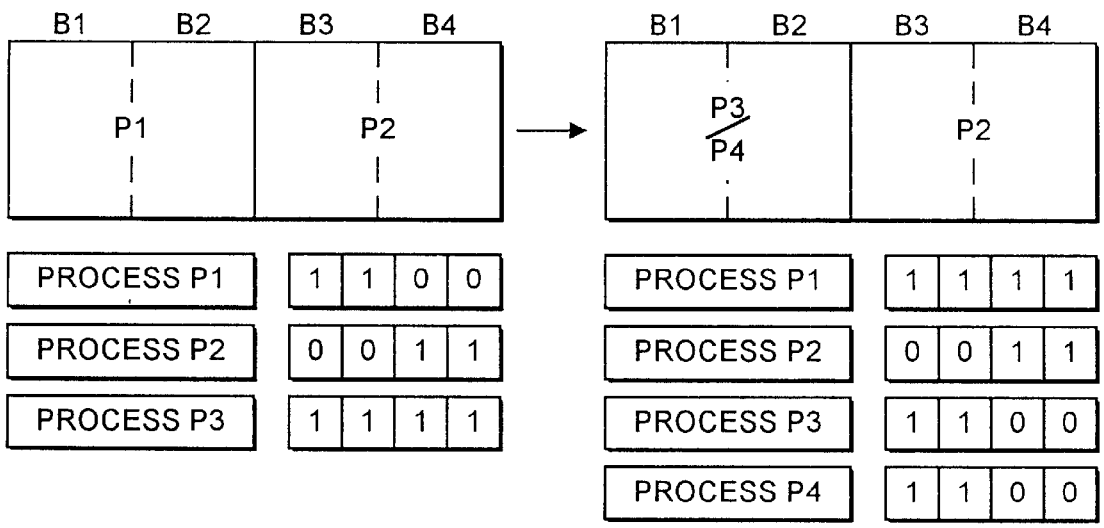
FIG. 7 is a diagram illustrating the alteration in caching behaviour for the system of FIG. 6.
Figure 8:
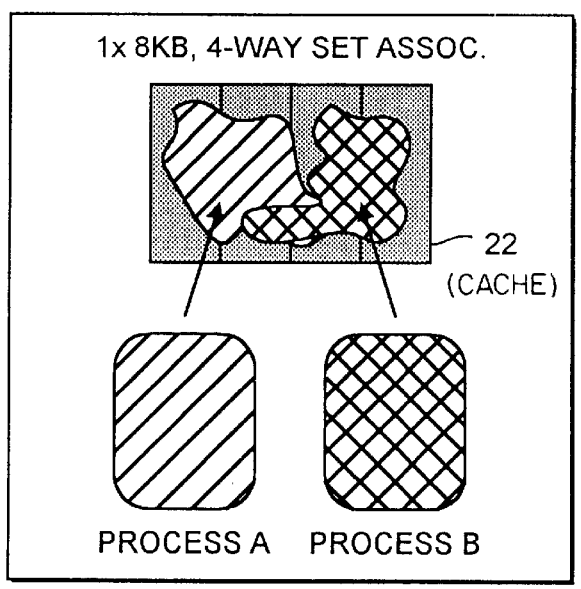
FIG. 8 illustrates a non-partitioned cache.

The cache partitioning mechanism described herein avoids the timing delays sad uncertainties which can result from this. FIG. 7 shows the partitioning of the cache while the processor is running process P1, and the change in the partitioning when the processor switches to running P3 etc. FIG. 7 also shows the TLB cache partition indicators for each case. Thus, on the left hand side FIG. 7 shows the cache partitioned while the processor is running processes P1 and P2. The process P1 may use banks B1 and B2 of the cache, but may not use banks B3 and 34. Conversely, the process P2 may use banks B3 and B4, but not banks B1 and B2. This can be seen in the TLB entries. This is, process P1 has a cache partition indicator allowing it to access banks B1 and B2, but not B3 and B4. Process P2 has cache partition indicators allowing them to access banks B3 and B4 but not B1 and B2. Process P3 has a cache partition indicator which prevents it from accessing the cache. Thus, any attempt by the processor to load data items from the process P3 into the cache would be prohibited. For the described process sequence, this however is not a disadvantage because, as can be seen, the processor is not intending to execute any part of the process P3 until it has finished executing process P1. If it did for sonic reason have to execute P3, the only downside would be that it would have to make its accesses from direct memory and would not be allowed use of the cache.

When the process P1 has finished executing, the processor can request kernel mode to allow it to alter the cache partition indicators for the processes. The manner in which this is done depends on how the partitioning mechanism is implemented. For the above described example, the partition code can be set in the TLB like any other TLB entry. Thus, the partition codes are normally set by kernel mode software running on the CPU 2. However, a user may alter partitions by requesting that the cache partitions be altered. In that event, the CPU 2 would change to kernel mode to implement the request, change the TLB entries accordingly and then return to the user mode to allow the user to continue. Thus, a user can alter the partitioning behaviour of the cache, thus providing much greater flexibility than has hitherto been possible. The change is illustrated on the right hand side of FIG. 7. Thus, now the cache partition indicators prevent the process P1 from using the cache at all, but allocate banks B1 and B2 to the processes P3 and P4, by altering the cache partition indicator for processes P3 and P4 so that it can access these banks of the cache. Thus, when the processor is expecting to execute the process P3, it now has a cache facility.

Figure 9:
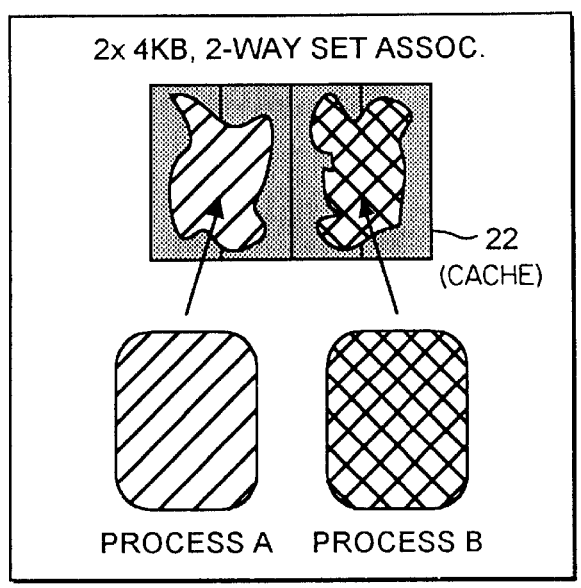
FIGS. 9 and 10 illustrate useful applications of the invention.

Thus, a system has been described above which prevents concurrent processes from evicting each others data from the data cache. That is, the processes are mapped to disjoint data cache partitions. This effectively gives each process its own private data cache. While this does reduce the amount of data cache space available to both processes, it makes their performance much easier to predict accurately. The result of the system described herein is illustrated in FIG. 9.

Figure 10:
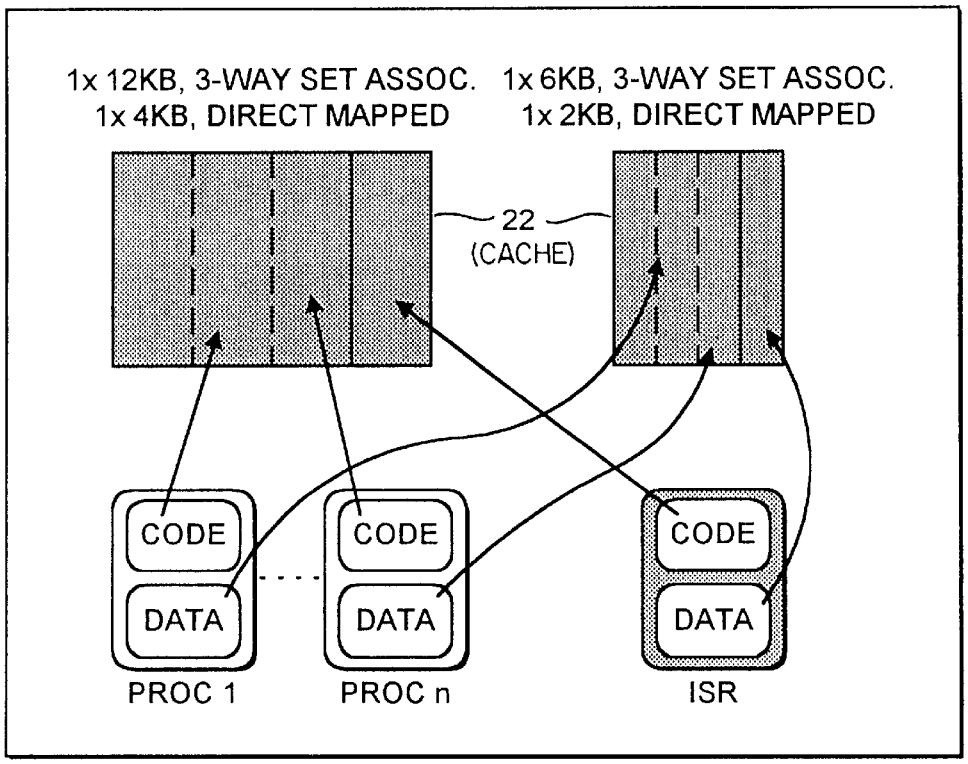

Another area where the system described herein is particularly useful is in the implementation of performance-critical routines. Often, there are a few routines whose performance is absolutely critical to the overall performance of the system. A good example of this might be an interrupt service routine which, when called, must produce an effect in a guaranteed (and usually short) length of time. In these cases, cache partitions may be reserved in both the data and instruction caches for the data and code required for these important routines. The rest of the instruction and data caches may then be shared out among the remaining processes. FIG. 10 illustrates a possible arrangement. In FIG. 10, an example is shown of reserving one 2 kilobyte partition in the data cache and one 4 kilobyte partition in the instruction cache for a performance critical interrupt service routine.

It will be appreciated that the present invention is not restricted to the specifically described embodiment above. Some particular possible variations are mentioned below, but this is not a comprehensive list of the variations which are possible within the scope of the invention.

In the described embodiment above, the address issued by the CPU on address bus 4 is split into a virtual page number 4b and a line in page 4a. However, the invention can also be used in a situation where the entire virtual address is sent from the CPU to the look-up circuit for the cache. Conversely, the invention is also applicable in a situation where the CPU issues real addresses directly to the look-up circuit. What is important is that the cache partition indicator is provided in association with the particular process being executed.

In the embodiment described above, a single cache access circuit 20 is shown for accessing the cache both on look-up and refill. However, it is also possible to provide the cache with an additional access port for refill, so that look-up and refill take place via different access ports for the cache memory 22.

In the described embodiment, the refill engine 30 and cache access circuit 20 are shown in individual blocks. However, it would be quite possible to combine their functions into a single cache access circuit which performs both look-up and refill.

The following are possible alternatives for generation of the partition indicator in association with a particular process.

In one alternative, the partition indicator may be placed directly in the thread status word TSW. For the described thread status word, this could be done by allocating the currently reserved bits 56 to 59 of the TSW to a new field TSW.PI. The value of the TSW.PI would then be passed to the refill engine 30 directly from the CPU. This would require a modification to the architecture illustrated in FIG. 1 to connect the partition indicator bus 36 directly from the CPU 2 to the refill engine 30, rather than from the TLB 10. For this implementation, the partition indicator PI is changed when a new thread status word TSW is loaded for the next thread to be executed. This can be done by a particular setting instruction which sets the parameters of the thread status word.

In another implementation, a table can be provided in the translation look-aside buffer 10 which maps the group number to the partition indicator PI without using the virtual address. This could be done by having a table indexed by group number which returns the partition indicator, or a table which has a group number/partition indicator pair which returns the partition indicator for the matching group. In this case, the architecture of FIG. 1 would be unaltered, but a different table would be required in the translation look-aside buffer 10. In this implementation, the partition indicator could be changed using a "put" instruction which has two operands, the control register number to be changed and its new value. All control registers would be allocated a number which can be used to access it using this instruction, and so each entry in the group number/partition indicator table would have a unique control register number.

What is claimed is:

1. A method of operating a cache memory arranged between a processor and a main memory of a computer, the processor being capable of executing a plurality of processes wherein each process includes a sequence of instructions, the method comprising:

dividing the cache memory into cache partitions, each cache partition having a plurality of addressable storage locations for holding items in the cache memory;

allocating to each process a partition indicator identifying which, if any, of said cache partitions is to be used for holding items for use in the execution of that process;

when the processor requests an item from main memory during execution of a current process and that item is not held in the cache memory, fetching the item from main memory and loading it into one of the plurality of addressable storage locations in the identified cache partition for said current process, and wherein:

the partition indicator comprises a plurality of bits associated respectively with the partitions, a status of each bit indicating whether or not that process can use the partition associated with that bit; and items are accessed from the cache memory regardless of the cache partition in which the item is held in the cache memory.

2. A method according to claim 1, wherein the partition indicator is included in a group identifier for the process, the group identifier identifying an address space for the process.

3. A method according to claim 1, comprising the step of holding in a store the partition indicator for a current process witch is currently being executed.

4. A method according to claim 3, wherein when a new process is to be executed by the processor, a new partition indicator allocated to that new process is loaded into said store.

5. A method according to claim 3, wherein the store which holds the partition indicator for the current process is a process status store which also holds status information about the process.

6. A method according to claim 2, wherein the processor issues addresses comprising a virtual page number and a line-in page number and wherein a translation look-aside buffer is provided for translating the virtual page number to a real page number for accessing the main memory, the translation look-aside buffer also receiving the group identifier and deriving therefrom the partition indicator for the current process.

7. A method according to claim 1, wherein the number of addressable storage locations in each cache partition is alterable.

8. A computer system comprising:
  a processor for executing a plurality of processes wherein each process includes a sequence of instructions, the processor including a process status store which holds a partition indicator for a current process which is current being executed;
  a main memory;
  a cache memory having a set of cache partitions, each cache partition comprising a plurality of addressable storage locations for holding items fetched from said main memory for use by the processor in execution of its processes; and
  a cache refill mechanism arranged to fetch an item from the main memory and to load said item into the cache memory at one of said addressable storage locations, wherein the cache refill mechanism selects said one of said addressable storage locations for loading said items in dependence on the partition indicator held in the process status store in association with the current process, the partition indicator comprising a plurality of bits associated respectively with the partitions, a status of each bit indicating whether or not that process can use the partition associated with that bit; and
  a cache access circuit operable to access items from the cache memory regardless of the cache partition in which the item is held in the cache memory.

9. A computer system according to claim 8, wherein the partition indicator is included in a group identifier for each process which identifies an address space for the process.

10. A computer system according to claim 9, wherein the processor issues addresses comprising a virtual page number and a line-in page number and wherein the system comprises a translation look-aside buffer for translating the virtual page number to a real page number for accessing the main memory, the translation look-aside buffer being operable to receive said group identifier and to derive therefrom the partition indicator for the current process.

* * * * *

UNITED STATES PATENT AND TRADEMARK OFFICE
CERTIFICATE OF CORRECTION

PATENT NO. : 6,629,208 B2 Page 1 of 1
DATED : September 30, 2003
INVENTOR(S) : Andrew Craig Sturges and David May It is certified that error appears in the above-identified patent and that said Letters Patent is hereby corrected as shown below:

Title page,
Item [74], should read:
-- [74] *Attorney, Agent, or Firm* – Wolf, Greenfield & Sacks, P.C.; James H. Morris; Robert A. Skrivanek, Jr. --

Column 11,
Lines 1-3, Claim 3 should read:
3. A method according to claim 1, comprising the step of holding in a store the partition indicator for a current process which is currently being executed.

Signed and Sealed this

Sixth Day of January, 2004

JAMES E. ROGAN
*Director of the United States Patent and Trademark Office*